US012586809B2

(12) United States Patent
Hwang et al.

(10) Patent No.: US 12,586,809 B2
(45) Date of Patent: Mar. 24, 2026

(54) METHOD FOR MANUFACTURING SECONDARY BATTERY, COUPLING CLIP FOR MANUFACTURING SECONDARY BATTERY, AND SECONDARY BATTERY

(71) Applicant: LG Energy Solution, Ltd., Seoul (KR)

(72) Inventors: Won Pill Hwang, Daejeon (KR); Sang Woo Lee, Daejeon (KR); Su Taek Jung, Daejeon (KR); Sang Ho Bae, Daejeon (KR); Min Cheol Choi, Daejeon (KR); Jin Gon Kim, Daejeon (KR); Yong Jun Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 505 days.

(21) Appl. No.: 17/925,977

(22) PCT Filed: May 17, 2021

(86) PCT No.: PCT/KR2021/006151
§ 371 (c)(1),
(2) Date: Nov. 17, 2022

(87) PCT Pub. No.: WO2021/241929
PCT Pub. Date: Dec. 2, 2021

(65) Prior Publication Data
US 2023/0207855 A1 Jun. 29, 2023

(30) Foreign Application Priority Data
May 25, 2020 (KR) ........................ 10-2020-0062591

(51) Int. Cl.
*H01M 50/116* (2021.01)
*B65G 47/90* (2006.01)
(Continued)

(52) U.S. Cl.
CPC ..... *H01M 10/0404* (2013.01); *H01M 50/552* (2021.01); *H01M 50/588* (2021.01); *H01M 50/59* (2021.01)

(58) Field of Classification Search
CPC ........... H01M 10/0404; H01M 10/058; H01M 50/571; H01M 50/202; H01M 50/242;
(Continued)

(56) References Cited

U.S. PATENT DOCUMENTS 6,743,546 B1 6/2004 Kaneda et al.
2009/0011695 A1 1/2009 Liermann et al.
(Continued)

FOREIGN PATENT DOCUMENTS

CN 1822412 A 8/2006
CN 109473619 A 3/2019
(Continued)

OTHER PUBLICATIONS

Lee et al; "KR102103877B1 Device for Transferring Battery Cell Having Sensor for Sensing Electrode Lead"; Machine translation of KR 102103877 B1 obtained from ESpacenet Patent Translate (Year: 2017).*
(Continued)

*Primary Examiner* — Allison Bourke
*Assistant Examiner* — Charlene Bermudez
(74) *Attorney, Agent, or Firm* — Lerner David LLP

(57) ABSTRACT

A method for manufacturing a secondary battery includes: an accommodating process of accommodating an electrode assembly in a battery case so that an electrode lead connected to the electrode assembly protrudes to both sides of the outside of the battery case; a sealing process of sealing an outer circumferential surface of the battery case after the accommodating process; a coupling process of coupling a coupling clip to the electrode lead after the sealing process;

(Continued)

and a transfer process of transferring the cell to a position for a next process after a gripper grips the coupling clip after the coupling process.

13 Claims, 15 Drawing Sheets

(51) Int. Cl.

| | |
|---|---|
| *H01M 10/04* | (2006.01) |
| *H01M 50/543* | (2021.01) |
| *H01M 50/552* | (2021.01) |
| *H01M 50/557* | (2021.01) |
| *H01M 50/572* | (2021.01) |
| *H01M 50/588* | (2021.01) |
| *H01M 50/59* | (2021.01) |

(58) Field of Classification Search

CPC ............. H01M 50/244; H01M 50/291; H01M 10/0431; H01M 10/0436; H01M 10/0463; H01M 10/0468; H01M 10/0472; H01M 10/0481; H01M 10/0486; H01M 10/049; H01M 50/543; H01M 50/548; H01M 50/553; H01M 50/557; B25B 5/145; F16B 5/06; F16B 45/022; F16B 45/023; F16B 45/024; F16B 45/027; F16B 45/028; F16B 45/034; F16B 45/035; F16B 45/036

See application file for complete search history.

(56) References Cited

U.S. PATENT DOCUMENTS

| | | | | |
|---|---|---|---|---|
| 2012/0121967 | A1 | 5/2012 | Nakamura et al. | |
| 2014/0147730 | A1 * | 5/2014 | Werner ............. | H01M 10/0436 |
| | | | | 29/623.2 |
| 2014/0333239 | A1 * | 11/2014 | Yokoyama ........... | E02F 9/0858 |
| | | | | 318/139 |
| 2017/0110763 | A1 | 4/2017 | Ro | |
| 2019/0006652 | A1 | 1/2019 | Kim | |
| 2019/0372064 | A1 | 12/2019 | Lee et al. | |
| 2020/0346587 | A1 * | 11/2020 | Guggenheim ........... | A61L 9/12 |

FOREIGN PATENT DOCUMENTS

| | | | | | |
|---|---|---|---|---|---|
| CN | 209401739 | U | | 9/2019 | |
| EP | 0191273 | A1 | * | 8/1986 | ............... F16B 5/06 |
| EP | 1217223 | A2 | * | 6/2002 | ............. F16B 19/04 |
| JP | 2004268147 | A | | 9/2004 | |
| JP | 2008-166208 | A | | 7/2008 | |
| JP | 2009032451 | A | | 2/2009 | |
| JP | 2009523622 | A | | 6/2009 | |
| JP | 2010205420 | A | | 9/2010 | |
| KR | 20120053463 | A | | 5/2012 | |
| KR | 20140015479 | A | | 2/2014 | |
| KR | 20140015647 | A | | 2/2014 | |
| KR | 20140133140 | A | | 11/2014 | |
| KR | 20150061825 | A | | 6/2015 | |
| KR | 10-2016-0131657 | A | | 11/2016 | |
| KR | 20170044990 | A | | 4/2017 | |
| KR | 20170086766 | A | | 7/2017 | |
| KR | 102103877 | B | * | 9/2017 | ........... H01M 10/04 |
| KR | 20170103332 | A | | 9/2017 | |
| KR | 10-2018-0075290 | A | | 7/2018 | |
| KR | 101873709 | B1 | | 7/2018 | |
| KR | 20180135702 | A | | 12/2018 | |
| KR | 20190004150 | A | | 1/2019 | |
| KR | 20190138564 | A | | 12/2019 | |
| WO | 2018043879 | A1 | | 3/2018 | |

OTHER PUBLICATIONS

International Search Report for Application No. PCT/KR2021/006151 mailed Aug. 27, 2021, pp. 1-3.

Extended European Search Report including Written Opinion for Application No. 21811737.2 dated Nov. 2, 2023, pp. 1-8.

* cited by examiner

METHOD FOR MANUFACTURING SECONDARY BATTERY, COUPLING CLIP FOR MANUFACTURING SECONDARY BATTERY, AND SECONDARY BATTERY

CROSS-REFERENCE TO RELATED APPLICATIONS

The present application is a national phase entry under 35 U.S.C. § 371 of the International Application No. PCT/KR2021/006151 filed on May 17, 2021, which claims the benefit of the priority of Korean Patent Application No. 10-2020-0062591, filed on May 25, 2020, the disclosures of which are incorporated herein by reference in their entireties.

FIELD OF THE INVENTION

The present invention relates to a method for manufacturing a secondary battery, a coupling clip for manufacturing a secondary battery, and a secondary battery.

BACKGROUND OF THE INVENTION

Secondary batteries are rechargeable unlike primarily batteries, and also, the possibility of compact size and high capacity is high. Thus, recently, many studies on secondary batteries are being carried out. As technology development and demands for mobile devices increase, the demands for secondary batteries as energy sources are rapidly increasing.

Rechargeable batteries are classified into coin type batteries, cylindrical type batteries, prismatic type batteries, and pouch type batteries according to a shape of a battery case. The secondary battery accommodates an electrode assembly and an electrolyte. In such a secondary battery, an electrode assembly mounted in a battery case is a chargeable and dischargeable power generating device having a structure in which an electrode and a separator are stacked.

The electrode assembly may be approximately classified into a jelly-roll type electrode assembly in which a separator is interposed between a positive electrode and a negative electrode, each of which is provided as the form of a sheet coated with an active material, and then, the positive electrode, the separator, and the negative electrode are wound, a stacked type electrode assembly in which a plurality of positive and negative electrodes with a separator therebetween are sequentially stacked, and a stack/folding type electrode assembly in which stacked type unit cells are wound together with a separation film having a long length.

A pouch type battery according to the related art is configured in a form in which an electrode assembly is accommodated in a pouch. In such a pouch type battery, when charging and discharging, the pouch swells and contracts repeatedly due to generation of a gas. Here, if the generated gas is left in the pouch, it causes deterioration in battery performance and a change in volume, which has a problem in that it adversely affects surrounding cells and structures. In addition, when the generated gas exceeds a storage limit of the pouch, a vent phenomenon in which the gas bursts into a structurally weak portion to leak occurs. When the vent phenomenon occurs, there are problems in that an electrolyte leaks, and the battery lifespan is exhausted.

In the related art, there is a problem in that damage such as wrinkling or stab in the electrode lead during gripping of the cell occurs with high probability due to bending of the electrode lead at an end of the pouch during a process of manufacturing the pouch cell.

When adjusting welding conditions to improve a degree of bending of the electrode lead, there is a greater risk of tab disconnection, etc., and thus, improvement of the degree of bending is almost impossible.

In addition, since a bending direction and angle of the electrode lead of the produced cells are random, it is also very difficult to adjust the bending conditions in adjustment of later processes.

[Prior Art Document] (Patent Document 1) Korean Patent Publication No. 10-2014-0015647

BRIEF SUMMARY OF THE INVENTION

One aspect of the present invention is to provide a method for manufacturing a secondary battery capable of preventing defects in lead bending from occurring during a manufacturing process, a coupling clip for manufacturing a secondary battery, and a secondary battery.

A method for manufacturing a secondary battery according to an embodiment of the present invention may comprise: an accommodating process of accommodating an electrode assembly in a battery case so that an electrode lead connected to the electrode assembly protrudes to both sides of the outside of the battery case; a sealing process of sealing an outer circumferential surface of the battery case after the accommodating process; a coupling process of coupling a coupling clip to the electrode lead after the sealing process; and a transfer process of transferring the cell to a position for a next process after a gripper grips the coupling clip after the coupling process.

In a coupling clip for manufacturing a secondary battery according to an embodiment of the present invention, the coupling clip may be previously coupled to a portion of an electrode lead of a cell, which is gripped by a gripper to allow the cell to move when the secondary battery is manufactured, an inner part of the coupling clip, which faces the electrode lead, may be made of a rubber material, and an outer part of the coupling clip may be made of plastic, and when coupled to the electrode lead, a fixing surface that faces each of both surfaces of the electrode lead and is in close contact with the electrode lead may be provided as a flat surface so that any bent portion of the electrode lead is straightened.

Furthermore, in a secondary battery according to an embodiment, the coupling clip for the secondary battery according to an embodiment of the present invention may be coupled.

According to the present invention, after the coupling clip is coupled to the electrode lead of the cell, the gripper may grip the coupling clip to transfer the cell to the position for the next process, thereby preventing the electrode lead from being wrinkled or damaged. In addition, the coupling clip may be coupled to be in close contact with the electrode lead of the cell to flatten the electrode lead, thereby preventing the defects from occurring due to the deformation of the electrode lead. As a result, the defect rate of the secondary battery is reduced to reduce the costs, and the number of stops and rest time of the production line may be significantly reduced.

US 12,586,809 B2

3

Figure 2:
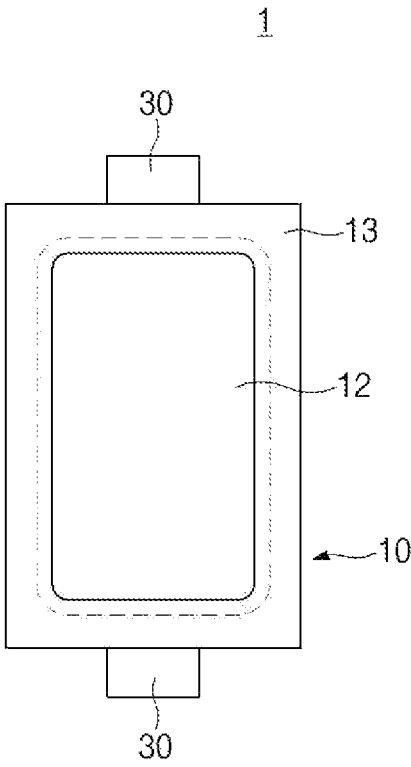

FIG. 2 is a plan view illustrating a sealing process in the method for manufacturing the secondary battery according to an embodiment of the present invention.

Figure 3:
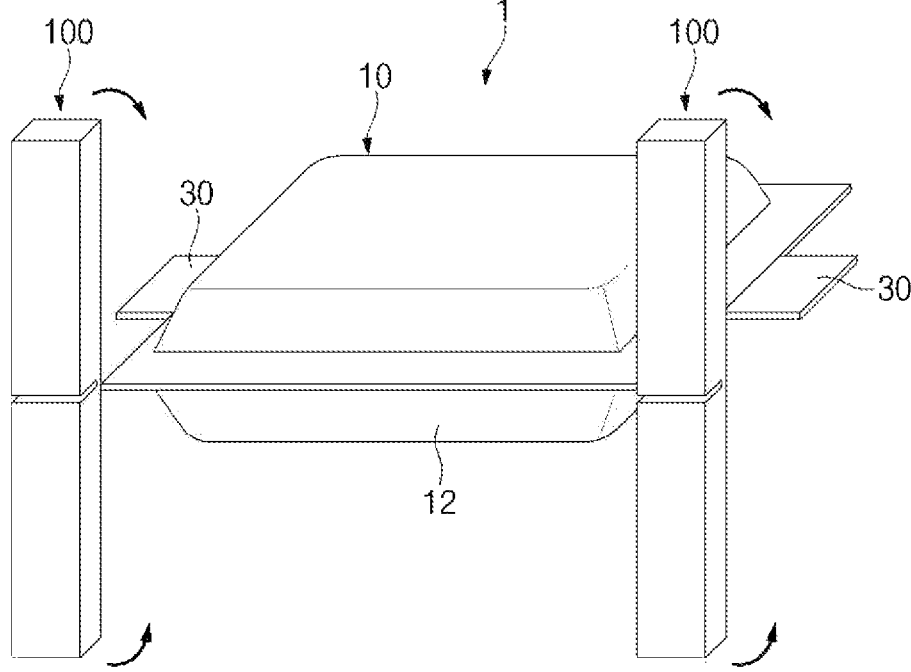

FIG. 3 is a perspective view illustrating a state before a coupling clip is coupled to an electrode lead in a coupling process in the method for manufacturing the secondary battery according to an embodiment of the present invention.

Figure 4:
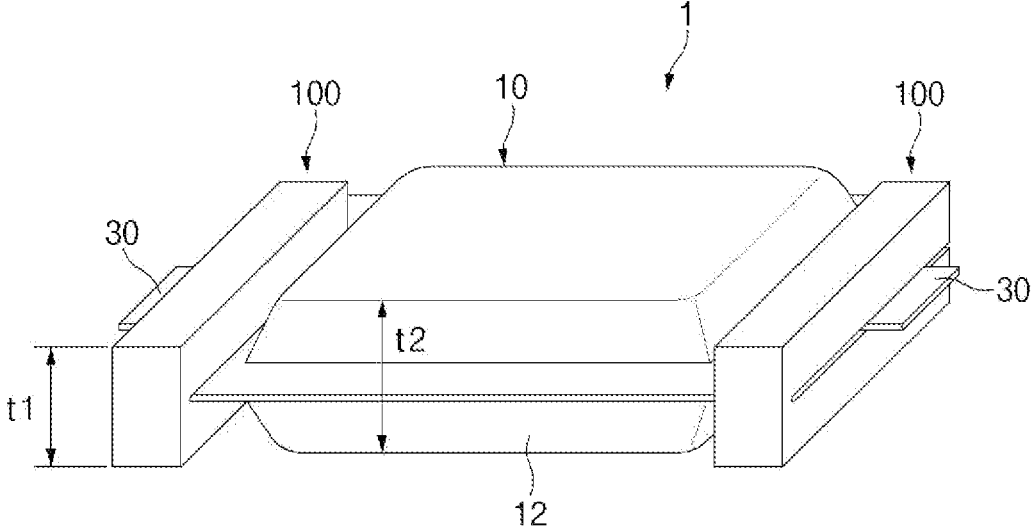

FIG. 4 is a perspective view illustrating a state in which the coupling clip is coupled to the electrode lead in the coupling process in the method for manufacturing the secondary battery according to an embodiment of the present invention.

Figure 5:
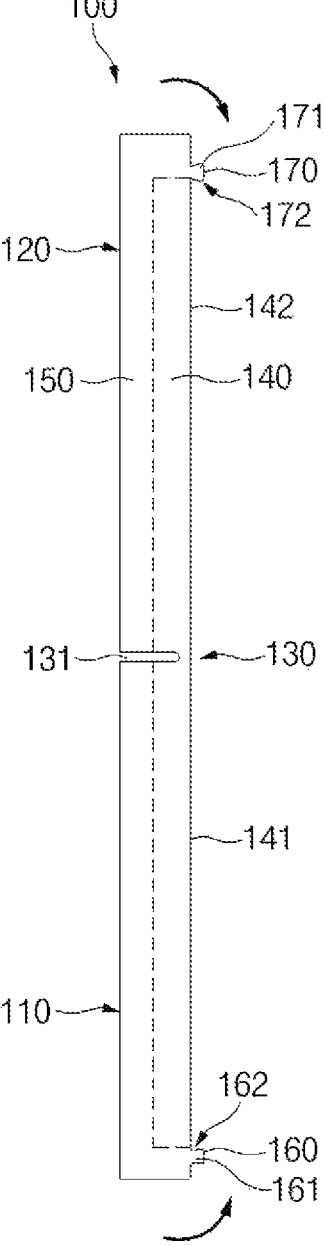

FIG. 5 is a side view illustrating a state before the coupling clip is folded in the coupling process in the method for manufacturing the secondary battery according to an embodiment of the present invention.

Figure 6:
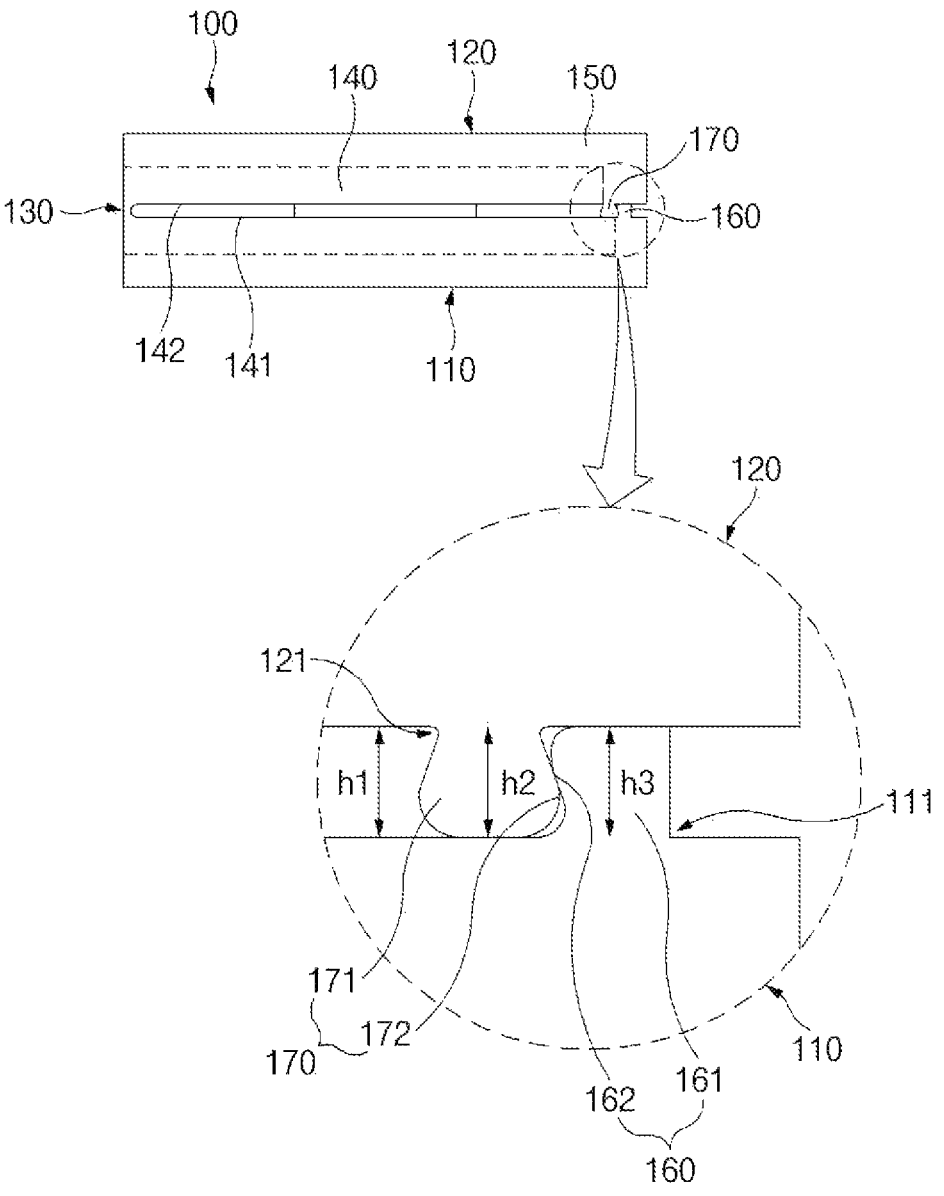

FIG. 6 is a side view illustrating a state after the coupling clip is coupled in the coupling process in the method for manufacturing the secondary battery according to an embodiment of the present invention.

Figure 7:
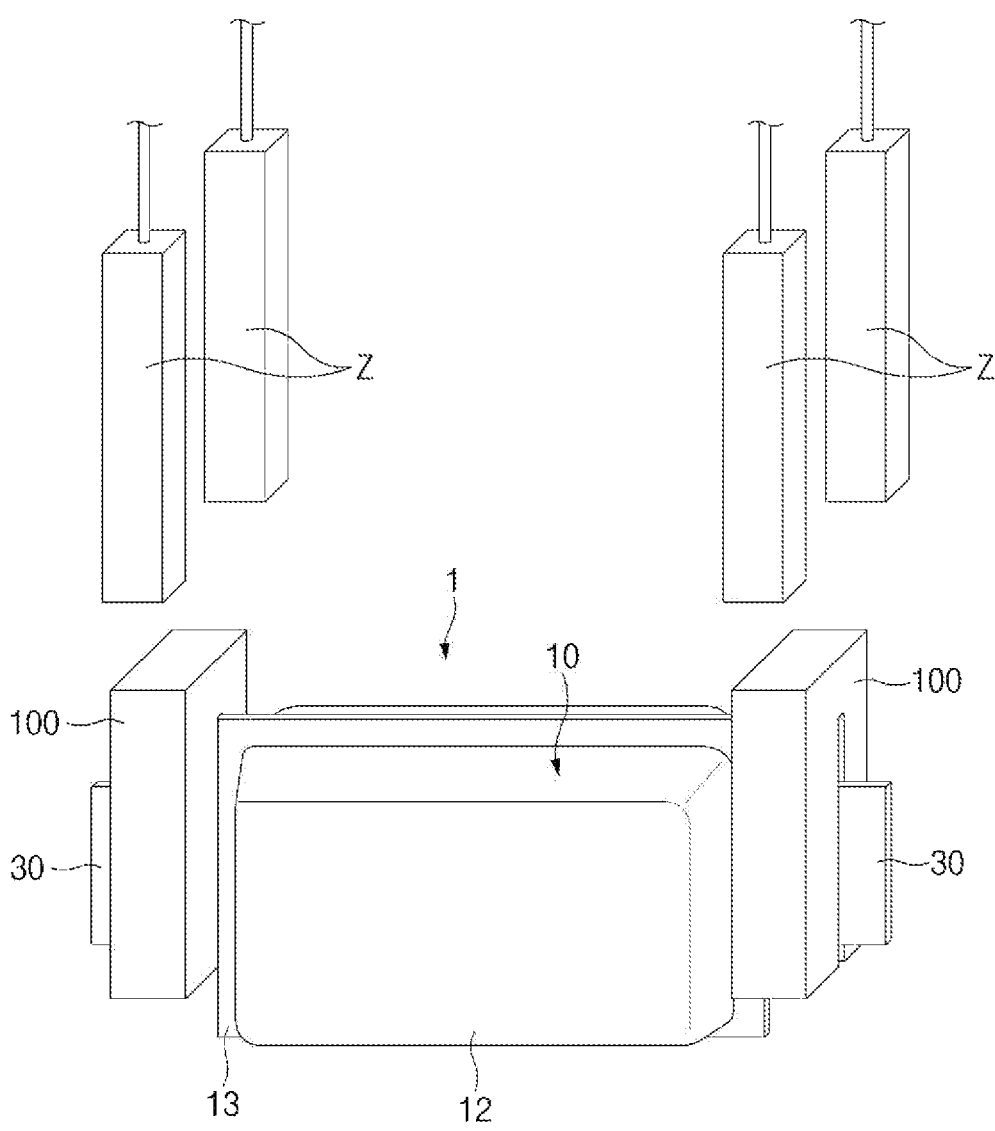

FIG. 7 is a perspective view illustrating a state before a gripper grips the coupling clip in a transfer process in the method for manufacturing the secondary battery according to an embodiment of the present invention.

Figure 8:
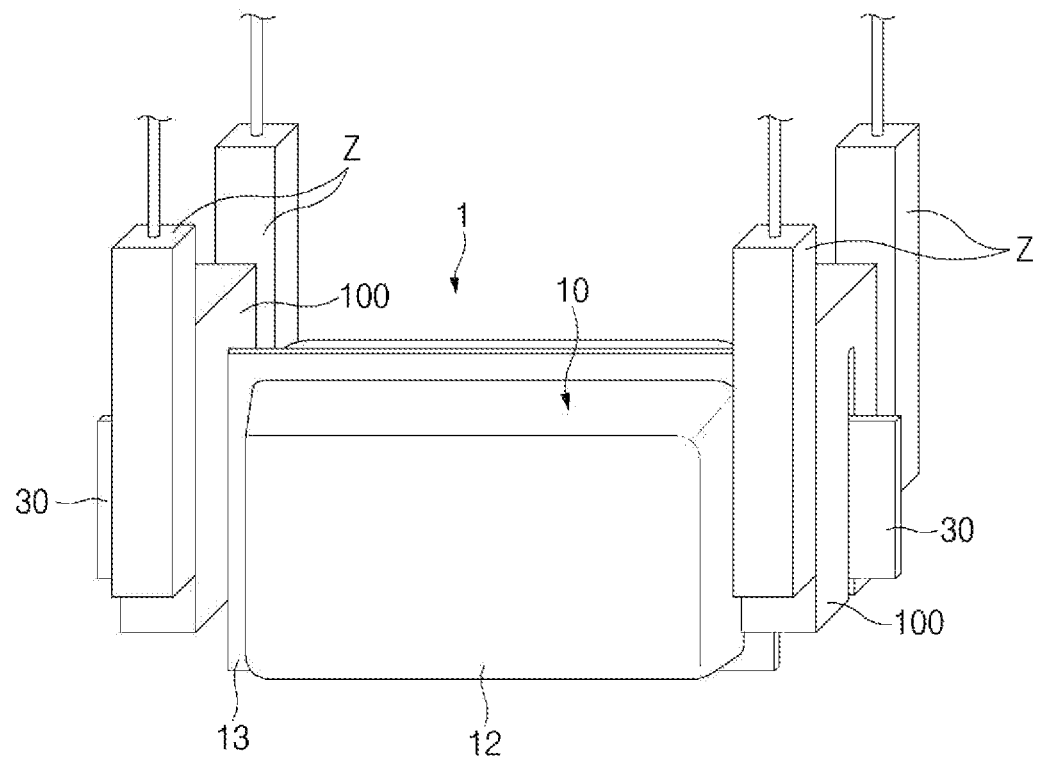

FIG. 8 is a perspective view illustrating a state in which the gripper grips the coupling clip in the transfer process in the method for manufacturing the secondary battery according to an embodiment of the present invention.

Figure 9:
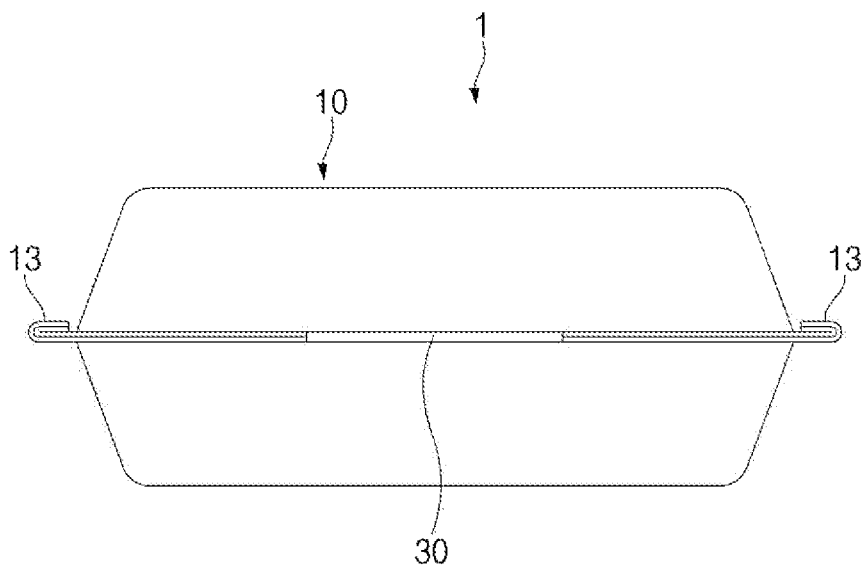

FIG. 9 is a side view illustrating a folding process in the method for manufacturing the secondary battery according to an embodiment of the present invention.

Figure 10:
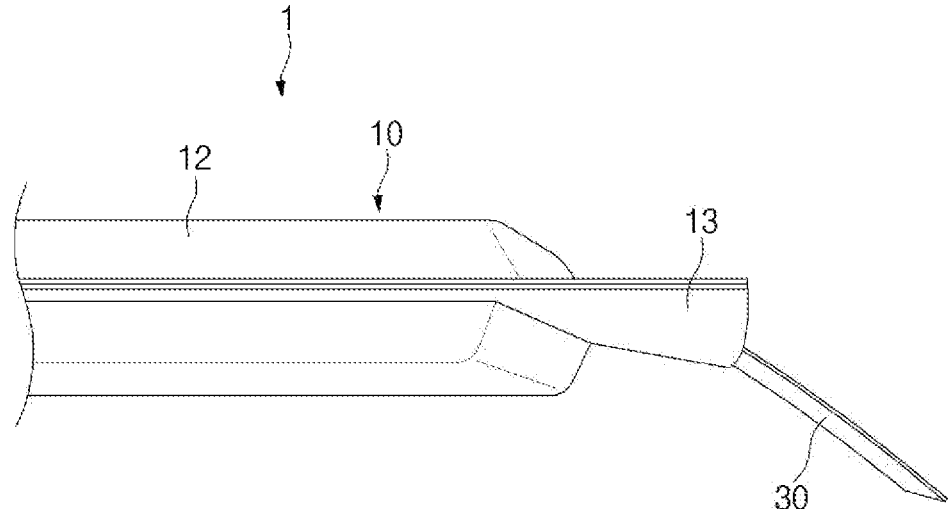

FIG. 10 is a perspective view illustrating a state before a coupling clip is coupled to an electrode lead in a coupling process in a method for manufacturing a secondary battery according to another embodiment of the present invention.

Figure 11:
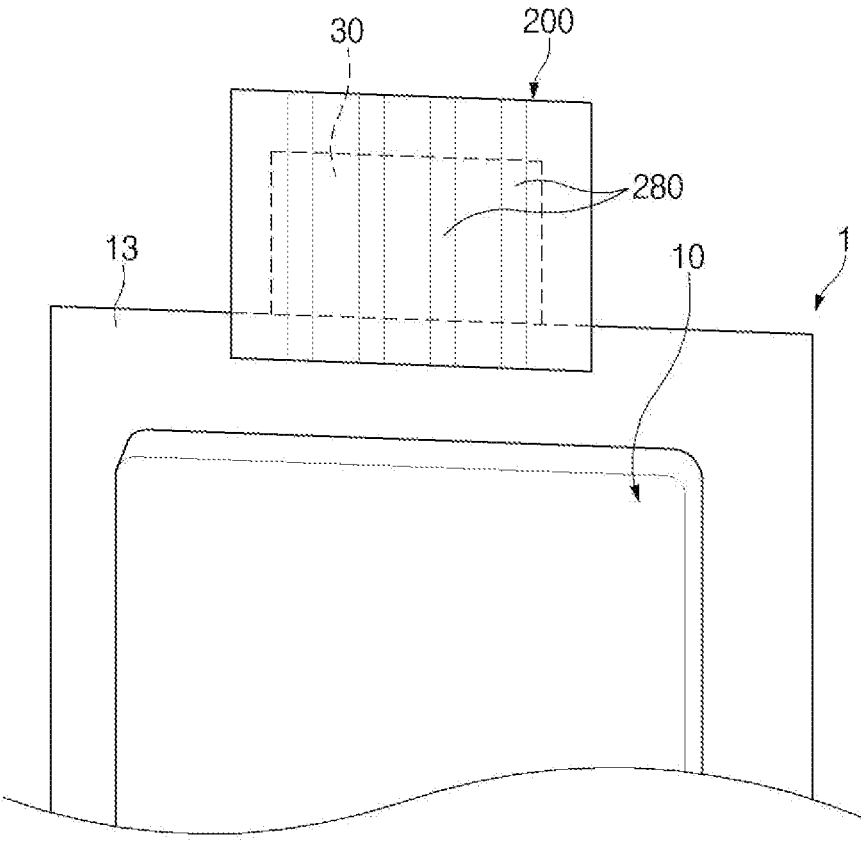

FIG. 11 is a perspective view illustrating a state in which the coupling clip is coupled to the electrode lead in the coupling process in the method for manufacturing the secondary battery according to another embodiment of the present invention.

Figure 12:
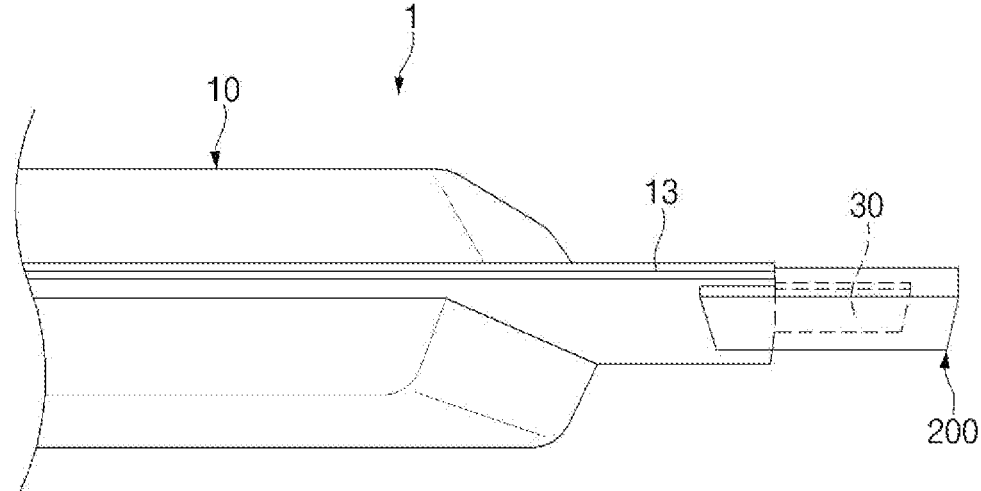

FIG. 12 is a perspective view illustrating a state in which the coupling clip is coupled to the electrode lead in the coupling process in the method for manufacturing the secondary battery according to another embodiment of the present invention.

Figure 13:
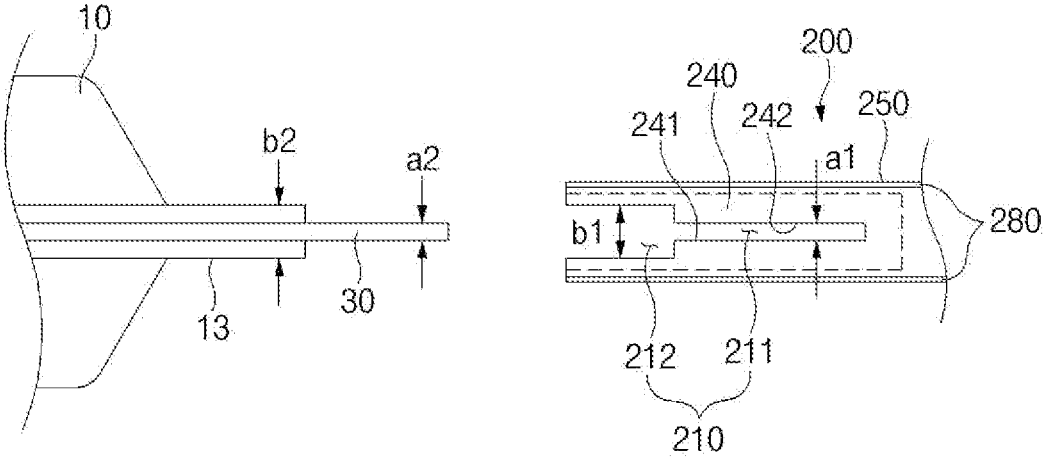

FIG. 13 is an exploded perspective view of the electrode lead and the coupling clip in the coupling process in the method for manufacturing the secondary battery according to another embodiment of the present invention.

Figure 14:
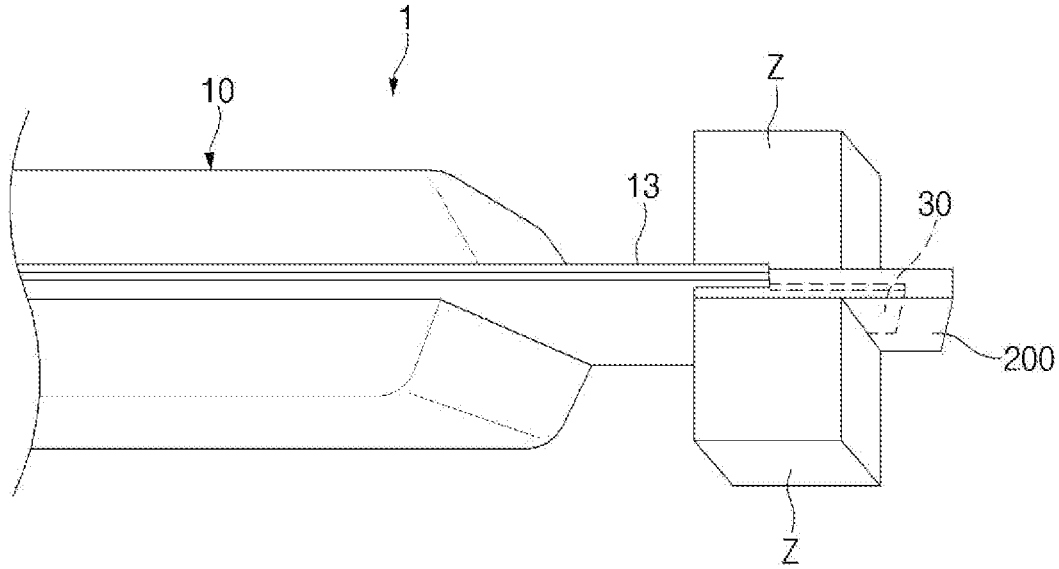

FIG. 14 is a perspective view illustrating a state in which a gripper grips the coupling clip in the transfer process in the method for manufacturing the secondary battery according to another embodiment of the present invention.

Figure 15:
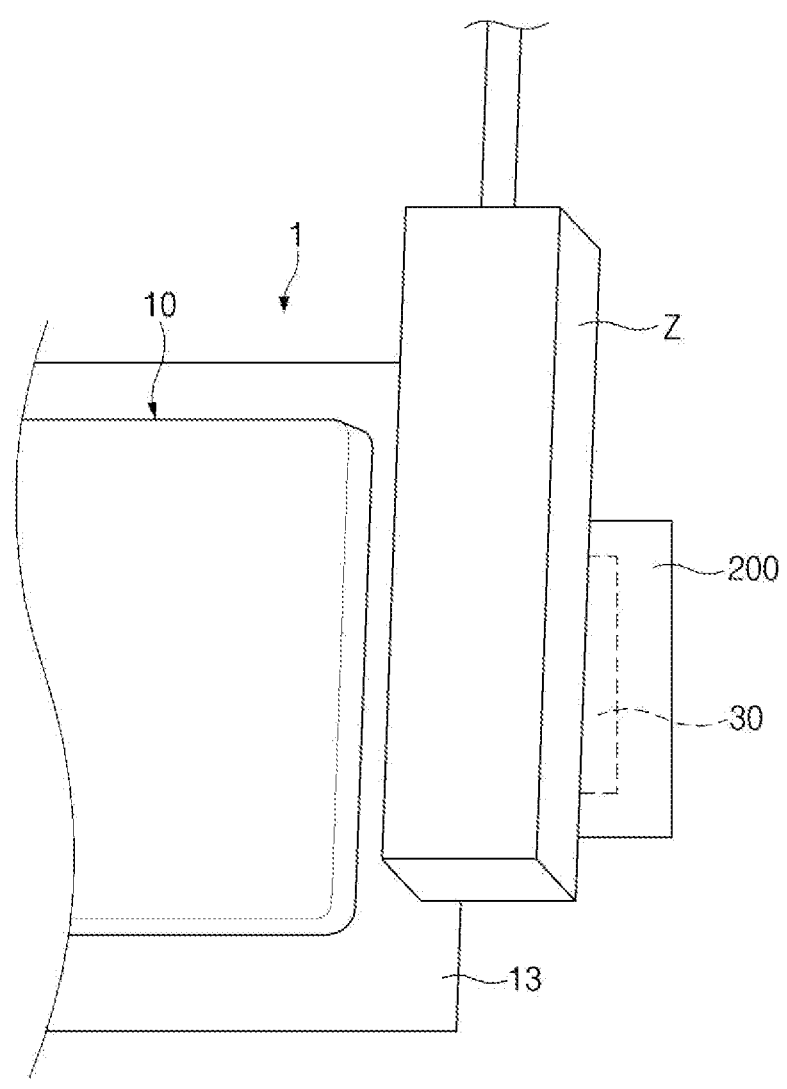

FIG. 15 is a perspective view illustrating a state in which a gripper grips the coupling clip in the transfer process in the method for manufacturing the secondary battery according to another embodiment of the present invention.

DETAILED DESCRIPTION

The objectives, specific advantages, and novel features of the present invention will become more apparent from the following detailed description taken in conjunction with the accompanying drawings. It should be noted that the reference numerals are added to the components of the drawings in the present specification with the same numerals as possible, even if they are illustrated in other drawings. Also, the present invention may be embodied in different forms and should not be construed as limited to the embodiments set forth herein. In the following description of the present invention, the detailed descriptions of related arts which may unnecessarily obscure the gist of the present invention will be omitted.

Method for Manufacturing Secondary Battery
According to an Embodiment

Figure 1:
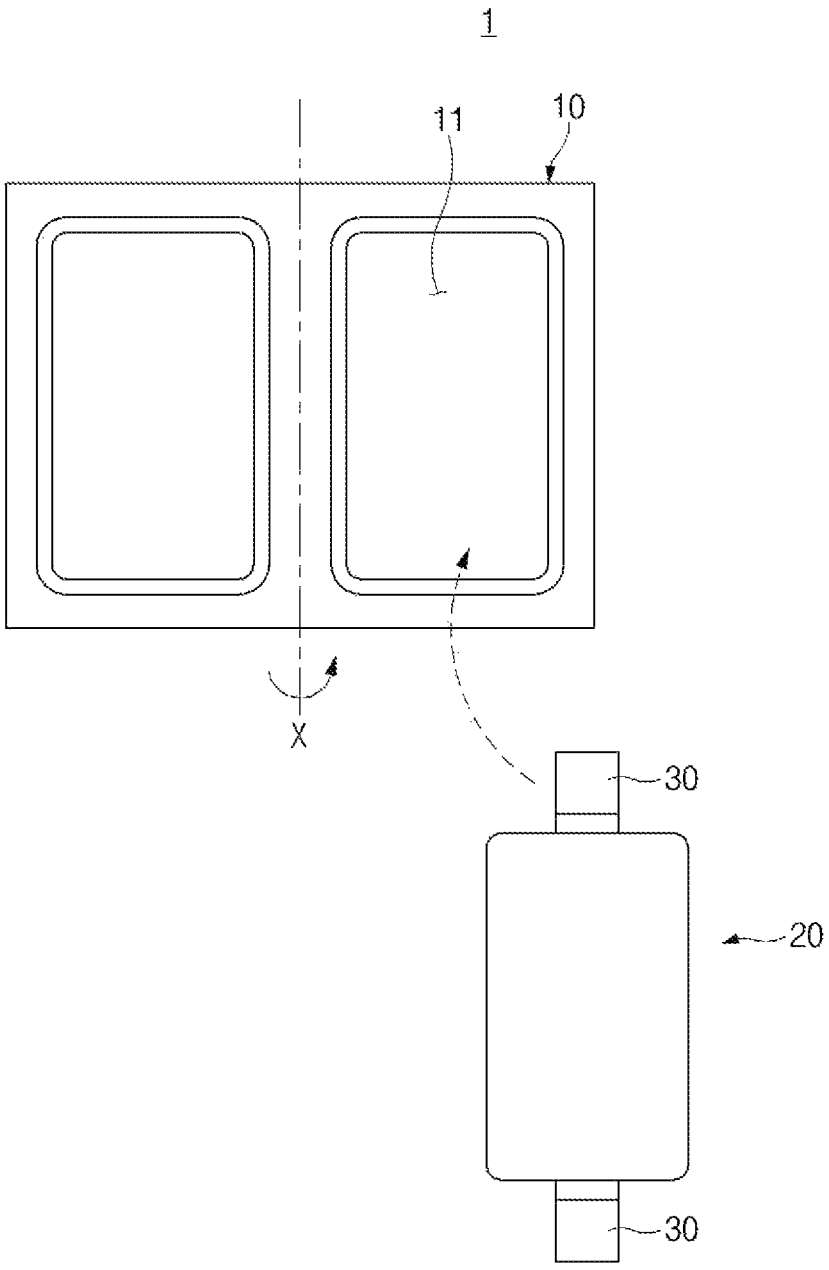
FIG. 1 is a plan view illustrating an accommodating process in a method for manufacturing a secondary battery according to an embodiment of the present invention.

FIG. 1 is a plan view illustrating an accommodating process in a method for manufacturing a secondary battery according to an embodiment of the present invention, FIG. 2 is a plan view illustrating a sealing process in the method for manufacturing the secondary battery according to an embodiment of the present invention, FIG. 3 is a perspective view illustrating a state before a coupling clip is coupled to an electrode lead in a coupling process in the method for manufacturing the secondary battery according to an embodiment of the present invention, and FIG. 4 is a perspective view illustrating a state in which the coupling clip is coupled to the electrode lead in the coupling process in the method for manufacturing the secondary battery according to an embodiment of the present invention.

In addition, FIG. 5 is a side view illustrating a state before the coupling clip is folded in the coupling process in the method for manufacturing the secondary battery according to an embodiment of the present invention, FIG. 6 is a side view illustrating a state after the coupling clip is folded in the coupling process in the method for manufacturing the secondary battery according to an embodiment of the present invention, FIG. 7 is a perspective view illustrating a state before a gripper grips the coupling clip in a transfer process in the method for manufacturing the secondary battery according to an embodiment of the present invention, FIG. 8 is a perspective view illustrating a state in which the gripper grips the coupling clip in the transfer process in the method for manufacturing the secondary battery according to an embodiment of the present invention, and FIG. 9 is a side view illustrating a folding process in the method for manufacturing the secondary battery according to an embodiment of the present invention.

Referring to FIGS. 1 to 9, a method for manufacturing a secondary battery according to an embodiment of the present invention comprises an accommodating process of accommodating an electrode assembly 20 in a battery case 10, a sealing process of sealing an outer circumferential surface 13 of the battery case 10 to form a cell 1, a coupling process of coupling a coupling clip 100 to an electrode lead 30, and a transfer process of transferring the cell 1 after gripping the coupling clip 100 by using a gripper Z. In addition, the method for manufacturing the secondary battery according to an embodiment of the present invention may further comprise a coupling release process of releasing the coupling of the coupling clip 100 and a folding process of folding a side of the battery case 10.

In more detail, referring to FIG. 1, in the accommodating process, the electrode assembly 20 may be accommodated in an accommodating part 11 of the battery case 10. Here, in the accommodating process, an electrode lead 30 connected to the electrode assembly 20 may be accommodated to protrude from both sides of the outside of the battery case 10.

The electrode assembly 20 is a chargeable and dischargeable power generating element, and electrodes and separators may be alternately stacked in the electrode assembly 20.

Here, an electrode tab and electrode lead 30, which are provided at an end of the electrode assembly 20 may be connected to each other to connect the electrode assembly 20 to an external device.

The electrodes may be constituted by a positive electrode and a negative electrode. At this time, the electrode assembly 20 may have a structure in which the positive electrode/separator/negative electrode are alternately stacked.

In addition, the electrode lead 30 may comprise a positive electrode lead connected to a positive electrode tab provided at an end of the positive electrode and a negative electrode lead connected to a negative electrode tab provided at an end of the negative electrode.

The positive electrode may comprise a positive electrode collector and a positive electrode active material stacked on the positive electrode collector.

The positive electrode collector may be made of an aluminum foil.

The positive electrode active material may comprise lithium manganese oxide, lithium cobalt oxide, lithium nickel oxide, lithium iron phosphate, or a compound or mixture containing at least one of the above-described materials.

The negative electrode may comprise a negative electrode collector and a negative active material stacked on the negative electrode collector.

The negative electrode collector may be made of, for example, a foil made of a copper (Cu) material.

The negative active material may be a compound or a mixture containing a graphite-based material.

The separator is made of an insulating material to electrically insulates the positive electrode and the negative electrode from each other. Here, the separator may be made of a polyolefin-based resin film such as polyethylene or polypropylene having microporosity.

Referring to FIGS. 1 and 2, in the sealing process, the cell 1 is formed by sealing the outer circumferential surface 13 of the battery case 10 after the accommodating process.

In the sealing process, the outer circumferential surface 13, which is an edge portion of a body 12 in which the electrode assembly 20 is accommodated, may be thermally fused by applying heat and a pressure.

Referring to FIGS. 3 to 6, in the coupling process, the coupling clip 100 is coupled to the electrode lead 30 after the sealing process.

The coupling clip 100 may be coupled to be in close contact with the electrode lead 30 so that any bent portion of the electrode lead 30 is straightened.

In the coupling process, both surfaces of the electrode lead 30 are fixed through the coupling clip 100, and each of fixing surfaces 141 and 142 of the coupling clip 100 facing both the surfaces of the electrode lead 30 may be formed as a flat surface.

In the coupling process, both sides of the electrode lead 30 may be fixed by folding both sides 110 and 120 in a direction closer to each other around a central portion of the coupling clip 100. Here, the coupling clip 100 has a cutoff portion 131 formed at the outside of the central portion, so that both the sides 110 and 120 are folded around the inside of the central portion. Here, when both the sides 110 and 120 are folded, the one side 110 and the other side 120 may be folded in a direction closer to each other.

In the coupling process, the electrode lead 30 may be wrapped in a " ⊏ " shape by folding the coupling clip 100.

In the coupling process, a thickness t1 of the coupling clip 100 coupled to the electrode lead 30 and a thickness t2 of the battery case 10 are the same, and both surfaces of the battery case 10 and both surfaces of the coupling clip 100 may be disposed on the same plane in a thickness direction.

In the coupling process, a folding part 130 may be formed at the central portion of the coupling clip 100 so that both the sides 110 and 120 are folded to fold both the sides 110 and 120 around the folding part 130. A first coupling part 160 and a second coupling part 170, which are coupled to each other, may be formed at ends of both the sides 110 and 120 of the coupling clip 100 to fix the folded state of the coupling clip 100. Here, the first coupling part 160 is provided at an end of the one side 110 of the coupling clip 100, and the second coupling part 170 is provided at an end of the other side 120. When both the sides 110 and 120 of the coupling clip 100 are folded around the folding part 130, the first coupling part 160 and the second coupling part 170 may be disposed on a surface facing the coupling clip 100.

The first coupling part 160 comprises a first protrusion 161, and the second coupling part 170 comprises a second protrusion 171. Thus, when both the sides 110 and 120 of the coupling clip 100 are folded around the folding part 130, the first protrusion 161 and the second protrusion 171 may be in alternately contact with each other and then be press-fitted to each other. Here, a coupling fitting groove 162 is formed at a side end of the first protrusion 161 in the first coupling part 160, and a protrusion 172 is formed on a portion corresponding to the coupling fitting groove 162 at a side end of the second protrusion 171 in the second coupling part 170. As the coupling protrusion 172 is press-fitted into the fitting groove 162, the first coupling part 160 and the second coupling part 170 may be coupled to each other.

In the coupling process, an inner part 140 of the coupling clip 100 coupled to the electrode lead 30 may be made of a rubber material, and an outer part 150 may be made of plastic. Here, the rubber material may be, for example, synthetic rubber or silicone rubber.

For example, each of a portion of the coupling clip 100, which faces the electrode lead 30 except for the first coupling part 160 and the second coupling part 170 inside thereof when folded, and the folding part 130 may be made of a rubber material. Here, each of the first coupling part 160 and the second coupling part 170 may be made of plastic.

For another example, a portion of the coupling clip 100, which faces the electrode lead 30 except for the folding part 130, the first coupling part 160, and the second coupling part 170 inside thereof when folded, may be made of a rubber material. Here, each of the folding part 130, the first coupling part 160, and the second coupling part 170 may be made of plastic. Here, since the plastic is made of a flexible material, folding of the folding part 130 may be easy, and also, the folding part 130 may be repeatedly reused.

As another example, the entire inner side of the coupling clip 100, which comprises the folding part 130, the first coupling part 160, and the second coupling part 170 when folded, may be made of a rubber material.

Referring to FIGS. 7 and 8, in the transfer process, after the coupling process is completed, the gripper Z grips the coupling clip 100, and then, the cell 1 is transferred to the subsequent manufacturing process.

Here, the gripper Z is provided as a pair and moves in a direction that are mutually close to each other to press and fix the coupling clip 100.

In the coupling release process, after the transfer process, the coupling of the coupling clip 100 coupled to the electrode lead 30 may be released.

Here, in the coupling release process, the coupling of the first coupling part 160 and the second coupling part 170 may be released to separate the coupling clip 100 from the electrode lead 30.

Referring to FIG. 9, in the folding process, the side of the battery case 10 may be folded.

In the folding process, both the sides, which are remaining two-directional portions except for two-directional portions in which the electrode lead 30 is disposed, in the four-directional portions of the outer circumferential surface 13 of the battery case 10, may be folded to be wound in the direction of the body 12 of the battery case 10.

Referring to FIG. 8, in the method for manufacturing the secondary battery according to an embodiment of the present invention, which is configured as described above, after coupling the coupling clip 100 to the electrode lead 30 of the cell 1, the gripper Z may grip the coupling clip 100 to transfer the cell 1 to a position for the next process, thereby preventing the electrode lead 30 from being wrinkled or damaged by an interference of the gripper Z. In addition, the coupling clip 100 may be in close contact with the electrode lead 30 to flatten the electrode lead 30, thereby preventing defects of the electrode lead 30 due to the deformation thereof from occurring. As a result, the defect rate of the secondary battery is reduced to reduce the costs, and the number of stops and rest time of the production line may be significantly reduced.

Method for Manufacturing Secondary Battery According to Another Embodiment

Hereinafter, a method for manufacturing a secondary battery according to another embodiment of the present invention will be described.

FIG. 10 is a perspective view illustrating a state before a coupling clip is coupled to an electrode lead in a coupling process in a method for manufacturing a secondary battery according to another embodiment of the present invention, FIG. 11 is a perspective view illustrating a state in which the coupling clip is coupled to the electrode lead in the coupling process in the method for manufacturing the secondary battery according to another embodiment of the present invention, and FIG. 12 is a perspective view illustrating a state in which the coupling clip is coupled to the electrode lead in the coupling process in the method for manufacturing the secondary battery according to another embodiment of the present invention.

FIG. 13 is an exploded perspective view of the electrode lead and the coupling clip in the coupling process in the method for manufacturing the secondary battery according to another embodiment of the present invention, FIG. 14 is a perspective view illustrating a state in which a gripper grips the coupling clip in the transfer process in the method for manufacturing the secondary battery according to another embodiment of the present invention, and FIG. 15 is a perspective view illustrating a state in which a gripper grips the coupling clip in the transfer process in the method for manufacturing the secondary battery according to another embodiment of the present invention.

Referring to FIGS. 1, 2, and 9 to 15, a method for manufacturing a secondary battery according to another embodiment of the present invention comprises an accommodating process of accommodating an electrode assembly 20 in a battery case 10, a sealing process of sealing an outer circumferential surface 13 of the battery case 10 to form a cell 1, a coupling process of coupling a coupling clip 200 to an electrode lead 30, and a transfer process of transferring the cell 1 after gripping the coupling clip 200 by using a gripper Z. In addition, the method for manufacturing the secondary battery according to another embodiment of the present invention may further comprise a coupling releasing process of releasing the coupling of the coupling clip 200 and a folding process of folding a side of the battery case 10.

The method for manufacturing the secondary battery according to another embodiment of the present invention is different from the above-described method for manufacturing the secondary battery according to an embodiment of the present invention in that a bonding clip 200 having a different structure is used in a coupling process. Thus, in descriptions of the method for manufacturing the secondary battery according to another embodiment of the present invention, contents duplicated with the method for manufacturing the secondary battery according to the forgoing embodiment of the present invention will be omitted or briefly described, and also, differences therebetween will be mainly described.

In more detail, referring to FIGS. 1 and 2, in the accommodating process, the electrode assembly 20 may be accommodated in an accommodating part 11 of the battery case 10. Here, in the accommodating process, an electrode lead 30 connected to the electrode assembly 20 may be accommodated to protrude from both sides of the outside of the battery case 10.

In the sealing process, the cell 1 is formed by sealing the outer circumferential surface 13 of the battery case 10 after the accommodating process.

Referring to FIGS. 10 to 13, in the coupling process, the coupling clip 200 is coupled to the electrode lead 30 after the sealing process.

The coupling clip 200 may be coupled to be in close contact with the electrode lead 30 so that any bent portion of the electrode lead 30 is straightened.

In the coupling process, an inner portion 240 of the coupling clip 200 coupled to the electrode lead 30 may be made of a rubber material, and an outer portion 250 may be made of plastic.

In the coupling process, a coupling groove 210 is formed in the coupling clip 200, so that a portion of an outer circumferential surface 13 of the electrode lead 30 and the battery case 10 are coupled to be inserted into the coupling groove 210.

In the coupling process, the coupling groove 210 of the coupling clip 200 comprises a lead accommodating part 211, into which the electrode lead 30 is inserted, and an outer circumferential surface accommodating part 212 into which an outer circumferential surface 13 of the battery case 10 is inserted. Here, a height a1 of the lead accommodating part 211 may be formed to correspond to a height a2 of the electrode lead 30, and a height b1 of the outer circumferential surface accommodating part 212 may be formed to correspond to a height b2 of the outer circumferential surface 13 of the battery case 10.

Thus, when the electrode lead 30 is inserted into the coupling groove 210 of the coupling clip 200 in the coupling process and then coupled, any bent portion of the electrode lead 30 may be straightened.

Referring to FIGS. 14 and 15, in the transfer process, after the coupling process is completed, the gripper Z grips the coupling clip 200, and then, the cell 1 is transferred to the subsequent manufacturing process.

In the coupling release process, after the transfer process, the coupling of the coupling clip 200 coupled to the electrode lead 30 may be released.

In the method for manufacturing the secondary battery according to another embodiment of the present invention, which is configured as described above, after coupling the coupling clip 200 to the electrode lead 30 of the cell 1, the gripper Z may grip the coupling clip 200 to transfer the cell 1 to a position for the next process, thereby preventing the electrode lead 30 from being wrinkled or damaged by an interference of the gripper Z. In addition, the electrode lead 30 may be coupled to the coupling groove 210 of the coupling clip 200 to flatten the electrode lead 30, thereby preventing defects of the electrode lead 30 due to deformation thereof from occurring. As a result, the defect rate of the secondary battery is reduced to reduce the costs, and the number of stops and rest time of the production line may be significantly reduced.

Coupling Clip for Manufacturing Secondary Battery According to an Embodiment

Hereinafter, the coupling clip for manufacturing the secondary battery according to an embodiment of the present invention will be described.

Referring to FIGS. 3 to 8, the coupling clip 100 for manufacturing the secondary battery according to an embodiment of the present invention comprises an inner part 140 and an outer part 150, which are previously coupled to a portion of the electrode lead 30 of the cell 1 gripped by the gripper Z to transfer the cell 1 and face the electrode lead 30 when the secondary battery is manufactured, and fixing surfaces 141 and 142 that are in close contact with the electrode lead 30. In addition, the coupling clip 100 for manufacturing the secondary battery according to an embodiment of the present invention further comprises both sides 100 and 120 provided with fixing surfaces 141 and 142 and a folding part 130 formed at the central portion.

The coupling clip 100 for manufacturing the secondary battery according to an embodiment of the present invention relates to the coupling clip 100 for manufacturing the secondary battery, which is applied to the method for manufacturing the secondary battery according to the foregoing embodiment and another embodiment of the present invention.

Therefore, in descriptions of the coupling clip 100 for manufacturing the secondary battery according to this embodiment, contents duplicated with those of the coupling clip according to the forgoing embodiment and another embodiment of the prevent invention will be omitted or briefly described, and differences will be mainly described.

In more detail, an inner part 140 of the coupling clip 100 may be made of a rubber material, and an outer part 150 may be made of plastic. Here, the inner part 140 faces the electrode lead 30, and the outer part 150 is disposed at an opposite side of the inner part 140 so as not to face the electrode lead 30. Thus, the inner part 140 is made of a rubber material, so that the electrode lead 30 or the cell 1 is not damaged when the coupling clip 100 is in contact with or coupled to the electrode lead 30.

In addition, the rubber material may be, for example, synthetic rubber or silicone rubber. Here, since the inner part 140 is made of silicone rubber, which is an insulating material and a high heat-resistant material, while the cell 1 moves, when the gripper Z grips the electrode lead 30 to which the coupling clip 100 is coupled, the electrode lead 30 and the gripper Z may be insulated from each other, and when heat is generated from the cell 1, the coupling clip 100 that is in contact with the electrode lead 30 may fix the electrode lead 30 without being damaged.

Fixing surfaces 141 and 142 of the coupling clip 100 face both sides of the electrode lead 30, respectively, and are formed as flat surfaces. Thus, when the coupling clip 100 is coupled to the electrode lead 30, any bent portion of the electrode lead 30 may be straightened.

Both sides 100 and 120 of the coupling clip 100 may comprise one side 110 having a first coupling part 160 at an end of the coupling clip 100 and the other side 120 having a second coupling part 170 coupled to the first coupling part 160 at an end of the coupling clip 100.

A folding part 130 may be formed at a central portion in a longitudinal direction so that both the sides 110 and 120 are foldable Here, the coupling clip 100 has a cutoff portion 131 formed at the outside of the central portion, so that both the sides 110 and 120 are folded around the inside of the central portion. Here, when the both the sides 110 and 120 are folded around the folding part 130 disposed inside the central portion, the coupling clip 100 may be folded in a direction in which the one side 110 and the other side 120 are close to each other. Here, the coupling clip 100 may be provided so as to surround the electrode lead 30 in a "ㄷ" shape when folded.

In addition, when both the sides 100 and 120 are folded around the folding part 130, the folded state may be fixed by the first coupling part 160 and the second coupling part 170, which are coupled to each other, and then may be coupled to the electrode lead 30.

The first coupling part 160 comprises a first protrusion 161, and the second coupling part 170 comprises a second protrusion 171. Thus, when both the sides 110 and 120 of the coupling clip 100 are folded around the folding part 130, the first protrusion 161 and the second protrusion 171 may be in alternately contact with each other and then be press-fitted to each other. Here, a coupling fitting groove 162 is formed at a side end of the first protrusion 161 in the first coupling part 160, and a protrusion 172 is formed on a portion corresponding to the coupling fitting groove 162 at a side end of the second protrusion 171 in the second coupling part 170. As the coupling protrusion 172 is press-fitted into the fitting groove 162, the first coupling part 160 and the second coupling part 170 may be coupled to each other.

A distance h1 between the one side 110 and the other side 120, a height h3 of a first protrusion 161, and a height h2 of a second protrusion 171 may be the same.

When the coupling clip 100 is coupled to the electrode lead 30, the coupling clip 100 may be formed so that a thickness t1 of the coupling clip 100 and a thickness t2 of the battery case 10 are the same.

In addition, when the coupling clip 100 is coupled to the electrode lead 30, the coupling clip 100 may be formed so that both surfaces of the battery case 10 and both surfaces of the coupling clip 100 are disposed on the same plane.

Thus, when the gripper Z grips the coupling clip 100 coupled to the electrode lead 30 to move the cell 1, if the body 12 of the battery case 10 around the electrode lead 30 is gripped together, the body 12 may be prevented from being pressed and damaged.

Coupling Clip for Manufacturing Secondary Battery According to Another Embodiment Hereinafter, a coupling clip for manufacturing a secondary battery according to another embodiment of the present invention will be described.

Referring to FIGS. 10 to 15, a coupling clip 200 for manufacturing a secondary battery according to another embodiment of the present invention comprises an inner part 240 and an outer part 250, which are previously coupled to a portion of an electrode lead 30 of a cell 1 gripped by a gripper Z to transfer the cell 1 and face the electrode lead 30 when the secondary battery is manufactured, and fixing surfaces 241 and 242 that are in close contact with the electrode lead 30. In addition, in the coupling clip 200 for manufacturing the secondary battery according to another embodiment of the present invention, coupling grooves 210 having top and bottom surfaces, on which the fixing surfaces 241 and 242 are disposed, may be formed so that the electrode lead 30 is inserted and coupled. In addition, the coupling clip 200 for manufacturing the secondary battery according to another embodiment of the present invention may further comprise a support 280.

The coupling clip 200 for manufacturing the secondary battery according to another embodiment of the present invention is different from the coupling clip for manufacturing the secondary battery according to the foregoing embodiment of the present invention in a coupling structure.

Therefore, in descriptions of the coupling clip 200 for manufacturing the secondary battery according to this embodiment, contents duplicated with those of the coupling clip according to the forgoing embodiment of the prevent invention will be omitted or briefly described, and differences will be mainly described.

In more detail, an inner part 240 of the coupling clip 200 may be made of a rubber material, and an outer part 250 may be made of plastic. Here, the inner part 240 faces the electrode lead 30, and the outer part 250 is disposed at an opposite side of the inner part 240 so as not to face the electrode lead 30. Thus, the inner part 240 is made of a rubber material, so that the electrode lead 30 or the cell 1 is not damaged when the coupling clip 200 is in contact with or coupled to the electrode lead 30.

In addition, the rubber material may be, for example, synthetic rubber or silicone rubber. Here, since the inner part 240 is made of silicone rubber, which is an insulating material and a high heat-resistant material, while the cell 1 moves, when the gripper Z grips the electrode lead 30 to which the coupling clip 200 is coupled, the electrode lead 30 and the gripper Z may be insulated from each other, and when heat is generated from the cell 1, the coupling clip 200 that is in contact with the electrode lead 30 may fix the electrode lead 30 without being damaged.

Coupling groove 210 may be provided with fixing surfaces 241 and 242 on top and bottom surfaces thereof, and the electrode lead 30 and a portion of an outer circumferential surface 13 of a battery case 10, in which the electrode lead 30 is disposed, are inserted and coupled, respectively.

Here, the coupling groove 210 may be formed in a shape corresponding to each of shapes of the electrode lead 30 and the portion of the outer circumferential surface 13 of the battery case 10.

The fixing surfaces 241 and 242 face and are in close contact with both sides of the electrode lead 30, respectively, and are formed as flat surfaces. Thus, when the coupling clip 200 is coupled to the electrode lead 30, any bent portion of the electrode lead 30 may be straightened.

The coupling groove 210 may comprise a lead accommodating part 211, into which the electrode lead 30 is inserted, and an outer circumferential surface accommodating part 212 into which an outer circumferential surface 13 of the battery case 10 is inserted. Here, a height a1 of the lead accommodating part 211 may be formed to correspond to a height a2 of the electrode lead 30, and a height b1 of the outer circumferential surface accommodating part 212 may be formed to correspond to a height b2 of the outer circumferential surface 13 of the battery case 10.

The support 280 may be provided in plurality to extend in a direction in which the electrode lead 30 is inserted.

Thus, the coupling clip 200 may be supported through the supports 280 without being bent or deformed.

Secondary Battery

The secondary battery according to an embodiment of the present invention may be provided as the secondary battery to which the coupling clips 100 and 200 for manufacturing the secondary battery according to an embodiment or another embodiment of the present invention are coupled.

That is, referring to FIGS. 1, 4 and 12, the secondary battery according to an embodiment of the present invention comprises an electrode assembly 20, a battery case 10 in which the electrode assembly 20 is accommodated, an electrode lead 30 connected to the electrode assembly 10, coupling clips 100 and 200 coupled to the electrode lead 30.

While the present invention has been particularly shown and described with reference to exemplary embodiments thereof, it is to be understood that the scope of the present invention is not limited thereto. It will be understood by those of ordinary skill in the art that various changes in form and details may be made therein without departing from the spirit and scope of the present invention.

Furthermore, the scope of protection of the present invention will be clarified by the appended claims.

DESCRIPTION OF THE SYMBOLS

1: Cell
10: Battery case
11: Accommodating part
12: Boyd
13: Outer circumferential surface
20: Electrode assembly
30: Electrode lead
100, 200: Coupling clip
110: One side
120: The other side
130: Folding part
131: Cutoff part
140, 240: Inner part
141, 142, 241, 242: Fixing surface
150, 250: Outer part
160: First coupling part
161: First protrusion
162: Coupling fitting groove
170: Second coupling part
171: Second protrusion
172: Coupling protrusion
210: Coupling groove
211: Lead accommodating part
212: Outer circumferential surface accommodating part
280: Support
Z: Gripper

The invention claimed is:

1. A method for manufacturing a secondary battery, the method comprising:
   accommodating an electrode assembly in a battery case so that an electrode lead connected to the electrode assembly protrudes from each of first and second sides of an outside of the battery case;
   sealing an outer circumferential surface of the battery case after the accommodating process to form a cell;

coupling a coupling clip to the electrode lead after the sealing process by folding the coupling clip about a folding part of the coupling clip such that first and second sides of the coupling clip are folded over each other; and transferring the cell to a position for a next process after a gripper grips the coupling clip after the coupling process.

2. The method of claim 1, wherein, in the coupling step, the coupling clip is coupled to be in close contact with the electrode lead so that a bent portion of the electrode lead is straightened.

3. The method of claim 2, wherein, the coupling clip comprises an inner part coupled to the electrode lead and made of a rubber material, and an outer part made of plastic.

4. The method of claim 2, wherein, in the coupling step, first and second surfaces of the electrode lead are fixed by the coupling clip, and a fixing surface of the coupling clip facing one of the first and second surfaces of the electrode lead, is provided as a flat surface.

5. The method of claim 2, wherein, in the coupling step, first and second sides of the coupling clip are folded around the folding part of the coupling clip such that first and second sides are close to each other, to fix first and second surfaces of the electrode lead.

6. The method of claim 5, wherein, in the coupling step, the coupling clip is folded to surround the electrode lead in a "ㄷ" shape.

7. The method of claim 5, wherein, a thickness of the coupling clip coupled to the electrode lead and a thickness of the battery case are the same, and first and second surfaces of the battery case and the first and second surfaces of the coupling clip are disposed on the same corresponding plane in a thickness direction.

8. The method of claim 5, wherein, the coupling clip comprises:

the folding part at a central portion of the coupling clip so that the first and second sides of the coupling clip are foldable, and a first coupling part and a second coupling part, which are configured to couple to each other, formed on ends of the first and second sides of the coupling clip, respectively, to fix a folded state of the coupling clip.

9. The method of claim 1, wherein, the coupling clip comprises a coupling groove formed in the coupling clip so that the electrode lead and a portion of an outer circumferential surface of the battery case are inserted into the coupling groove.

10. The method of claim 9, wherein, the coupling groove of the coupling clip comprises a lead accommodating part, into which the electrode lead is inserted, and an outer circumferential accommodating part into which the outer circumferential surface of the battery case is inserted, and wherein, a height of the lead accommodating part is formed to correspond to a height of the electrode lead, and a height of the outer circumferential surface accommodating part is formed to correspond to a height of the outer circumferential surface of the battery case.

11. The method of claim 1, further comprising:

releasing the coupling of the coupling clip coupled to the electrode lead after the transfer process; and folding a side of the battery case.

12. The method of claim 1, wherein the gripper comprises a pair of grippers, and wherein transferring the cell comprises gripping the folded coupling clip between the pair of the grippers.

13. The method of claim 12, wherein a first gripper of the pair of grippers contacts the first side of the coupling clip and a second gripper of the pair of grippers contact the second side of the coupling clip.

* * * * *